US006206675B1

(12) United States Patent
BeVier

(10) Patent No.: US 6,206,675 B1
(45) Date of Patent: Mar. 27, 2001

(54) EXTRUSION DIE FOR THE MANUFACTURE OF MONOLITHIC ADSORPTION TUBES

(76) Inventor: William E. BeVier, 6 W. Grimsby Rd., Kenmore, NY (US) 14223

( * ) Notice: Subject to any disclaimer, the term of this patent is extended or adjusted under 35 U.S.C. 154(b) by 0 days.

(21) Appl. No.: 09/153,006

(22) Filed: Sep. 14, 1998

Related U.S. Application Data

(63) Continuation-in-part of application No. 08/876,342, filed on Jun. 16, 1997, now Pat. No. 5,806,323.

(51) Int. Cl.[7] .................................................... B29C 47/20
(52) U.S. Cl. ........................ 425/190; 425/380; 425/467; 264/177.12; 264/209.1; 264/209.8
(58) Field of Search ..................................... 425/461, 467, 425/380, 190; 264/209.1, 177.12, 209.8

(56) References Cited

U.S. PATENT DOCUMENTS

| | | | |
|---|---|---|---|
| 1,849,431 | * 3/1932 | Mayhew | ................................ 425/466 |
| 3,406,435 | * 10/1968 | Dietzsch | ................................. 425/96 |
| 3,905,743 | * 9/1975 | Bagley | ................................. 425/464 |
| 4,743,191 | * 5/1988 | Chao | ................................. 425/190 |
| 4,846,657 | * 7/1989 | Chao | ................................. 425/190 |
| 5,407,442 | * 4/1995 | Karapasha | ............................ 604/359 |
| 5,807,590 | * 9/1998 | Ishikawa et al. | ..................... 425/190 |
| 5,972,427 | * 10/1999 | Muhlfield | ............................. 427/244 |

* cited by examiner

*Primary Examiner*—Harold Pyon
*Assistant Examiner*—Joseph S. Del Sole
(74) *Attorney, Agent, or Firm*—Arthur S. Cookfair; James J. Ralabate

(57) ABSTRACT

The invention relates to an extrusion die for the manufacture of monolithic adsorption tubes having a solid body portion with a multiplicity of tunnels for the passage of gas. The die comprises a multiplicity of rods positioned within an outer cylindrical housing and oriented parallel thereto. The rods are supported near the entrance end of the housing, by at least two sets of ribs, each set of ribs arranged in a geometric pattern and oriented perpendicular to the cylindrical housing. The rods provide the form for tunnels in the extruded monolithic adsorption tube.

14 Claims, 5 Drawing Sheets

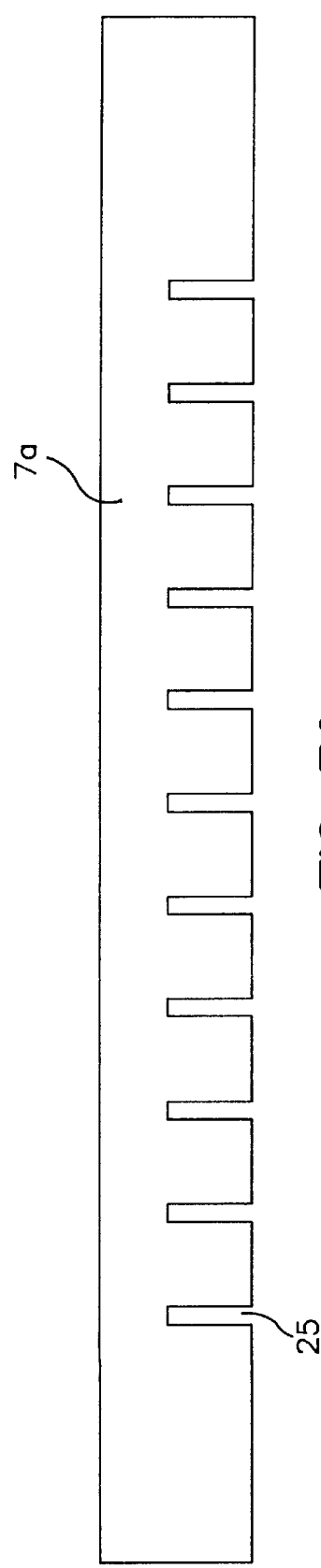
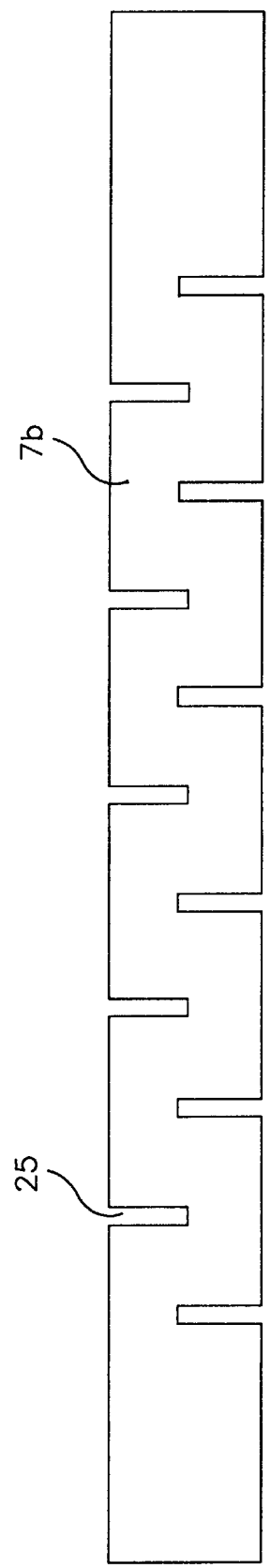

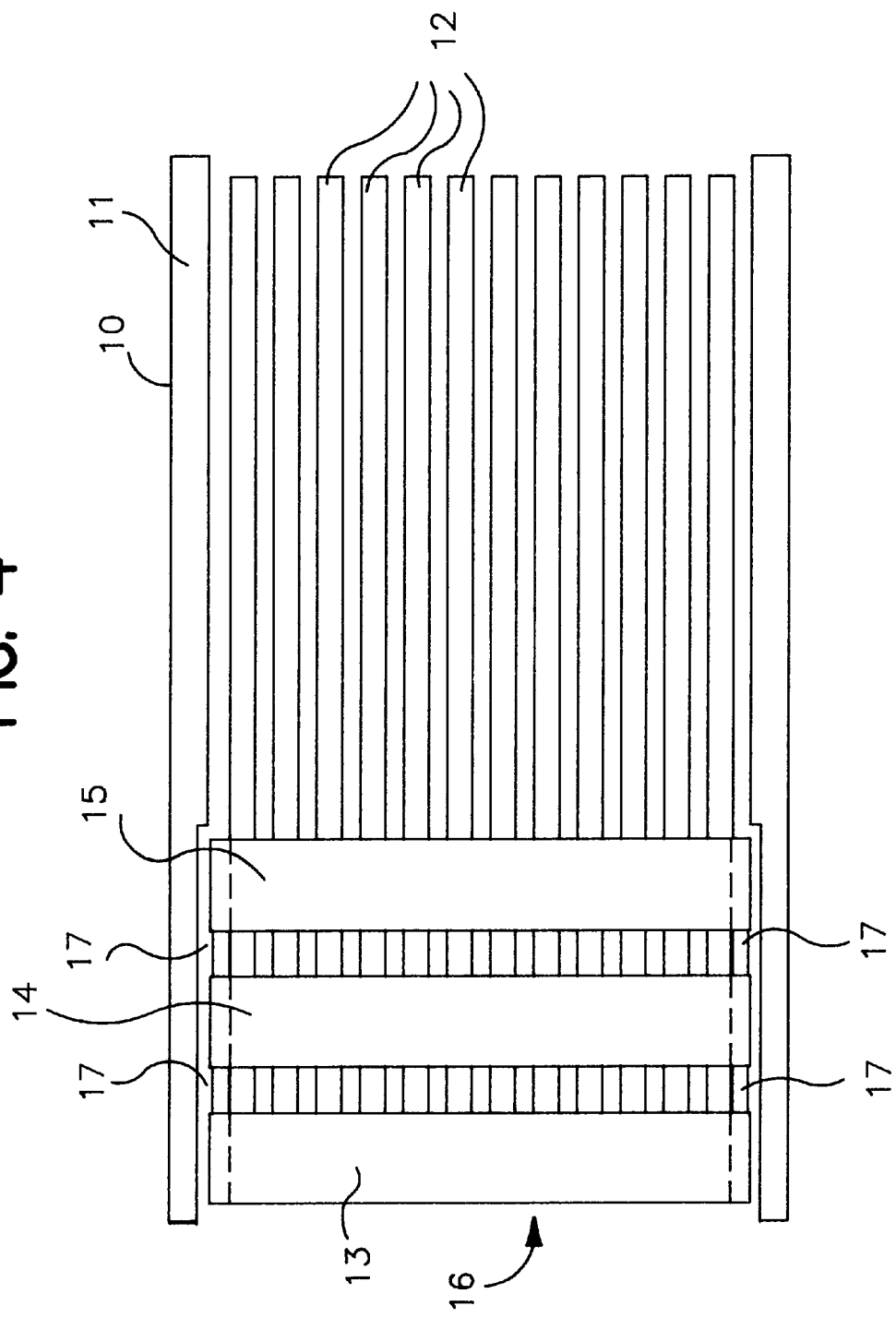

EXTRUSION DIE FOR THE MANUFACTURE OF MONOLITHIC ADSORPTION TUBES

This application is a continuation in part of U.S. patent application Ser. No. 08/876,342 filed on Jun. 16, 1997 and now U.S. Pat. No. 5,806,323.

This invention relates to an apparatus for the manufacture of monolithic tubes, containing equally distributed tunnels, by extrusion of an extrudable material through a novel extrusion die.

BACKGROUND OF THE INVENTION

Monolithic tubes having tunnels along the length thereof are useful for a variety of purposes. Thus, for example, thus, for example, monolithic tubes made of an adsorbent material and having parallel tunnels along the length thereof for the passage of gas may be used for the separation or purification of gases from gas mixtures. Similar structures made from other materials, such as cement, may be used for withdrawing and storing heat from fluids passing through the tunnels. Furthermore, in the fabrication of elongated monolithic structures, such as rods, the incorporation of a desired amount of void space in the form of parallel tunnels may be used to achieve a balance between strength and weight may be achieve a balance between strength and weight.

The use of adsorption materials for the separation or purification of gases from gas mixtures is known. Thus, for example, gases to be purified or gas mixtures to be separated with the aid of an adsorbent may be passed through vessel filled with particles of the adsorbent (particle bed). When the gas contacts the adsorbent, some is adsorbed. The selectivity of the adsorbent will allow some gases to pass through readily but will preferentially adsorb other gases. For example, silica gel will adsorb water vapor in preference to the other components of air and the air will therefore be dried. Some adsorbents will adsorb nitrogen much more readily than oxygen and, therefore, the gas emerging from the adsorbent vessel will have a higher concentration of oxygen than the air entering the vessel. When the adsorbent becomes filled or saturated with the gases that are preferentially adsorbed, the gas will pass through without changing its concentration. The adsorbent must then be desorbed to remove the adsorbed gases. The adsorbent may then be used again.

There are difficulties associated with the use of particle bed-type adsorbent vessels. For example, gas velocity must be very carefully controlled to avoid lifting of the particles or channeling of the gas through the particle bed. Furthermore, the bed must be maintained in a position for vertical flow of the gas. If the flow of gas is horizontal, the particles will tend to settle and the gas will be able to flow above the bed without particle contact. Moreover, the adsorbent particle distribution (by size) is important to the quality and capacity of the system. If, on settling, the smaller particles migrate and settle near the circumference of the vessel, it will cause a higher gas flow rate to occur at the vessel center where adsorption will take place preferentially and as that region becomes saturated, gases will pass through without adsorption and the particles near the circumference will be unused or underused.

The problems associated with the particle bed-type adsorbent vessels may be overcome with the use of monolithic adsorption tubes that may be formed by extrusion techniques and, in particular, with the use of the method and novel extrusion die of the present invention.

Various techniques and extrusion dies are disclosed in the literature for the extrusion of ceramic batches, plastics, cement, clay, adsorbents and similar materials which have the property of being able to flow or plastically deform during extrusion while being able to become sufficiently rigid thereafter so as to maintain structural integrity. Such techniques and dies have been used for the manufacture of various monolithic or honeycomb type of structures having a plurality of openings or passages extending therethrough.

U.S. Pat. No. 1,849,431 discloses the manufacture of clay conduits using a die assembly wherein a cross-head positions a plurality of spaced bells are mounted on longitudinal stems, which secured to bridges spanning the die side wall. The bells are of non-circular shape corresponding to the shape of the various passages to be formed in the conduit.

U.S. Pat. No. 3,406,435 discloses apparatus for manufacturing ceramic elements having a honeycomb structure wherein a plurality of elongated thin-walled sleeve members having extensions with closed end portions are connected to an extruder cylinder. The material to be extruded is forced through the elongated sleeve members and outwardly through orifices formed in side walls of the extensions attached thereto. The sleeve extensions are spaced from each other to provide channels in which the material from the orifices becomes reshaped into a honeycomb structure.

U.S. Pat. No. 3,905,743 discloses an extrusion die for forming thin-walled honeycomb structures. The extrusion die is of unitary construction having a plurality of interconnected discharge slots provided with uniform openings in the outlet face of the die.

Although a variety of extrusion dies and methods of use are set forth in the prior art, it will be apparent to those skilled in the art that need exists for an extrusion die apparatus that is less expensive and conveniently adaptable for the extrusion of monolithic tubes, such as, monolithic adsorption tubes and the like having variable numbers and sizes of longitudinal openings for the passage of fluids.

SUMMARY OF THE INVENTION

It is therefore an object of this invention to provide an extrusion die suitable for the manufacture of monolithic adsorption tubes having a solid body portion with a multiplicity of tunnels for the passage of fluids therethrough.

It is a further object of this invention to provide a relatively simple and inexpensive apparatus for the manufacture of monolithic adsorption tubes.

It is still another object of this invention to provide an extrusion apparatus for the manufacture of monolithic adsorption tubes having a solid body portion with a multiplicity of tunnels for the passage of gases therethrough wherein the extrusion apparatus may be conveniently adapted to produce various numbers and sizes of the tunnels therein.

These and other objects are accomplished in accordance with the present invention by an extrusion die comprising a) an outer housing having an entrance end and an exit end for the entrance and exiting of extrudable material;

b) at least two sub-assemblies, each comprising an outer ring rib collar holding a set of ribs, that is, a multiplicity of ribs forming a geometric pattern and oriented perpendicular to the outer housing and positioned approximate the entrance end thereof c) a multiplicity of rods positioned within the housing and rib collars and oriented parallel to the housing and passing through the ribs so that each rod is supportedly contacted by at least three ribs in at least two rib collars.

In practice, as the material to be extruded is forced through the extrusion die, the rods in the die will result in the formation of corresponding tunnels in the extruded monolith. The rods may be of various cross-sectional shapes, depending on the shape desired for the tunnels. Since the tunnels in the monolith are preferably circular in cross-section, the preferred rods are also circular in cross-section. The number, size and spacing of the tunnels may similarly be varied by selecting the appropriate number, size and spacing of the rods. In a preferred embodiment, the rods are substantially circular in cross-section, of uniform diameter and substantially evenly spaced within the die. The ribs are preferably arranged in a geometric pattern and each rib may be slotted at points along its length so that two or more ribs may be conveniently interlocked to provide stability to the die assembly.

BRIEF DESCRIPTION OF THE DRAWINGS

FIGS. 3a–3b are side views of a rib design embodiment of the invention.

FIG. 4 is a side view of an embodiment of an assembled extrusion die of the invention.

DETAILED DESCRIPTION OF THE DRAWINGS AND PREFERRED EMBODIMENTS

Figure 1:
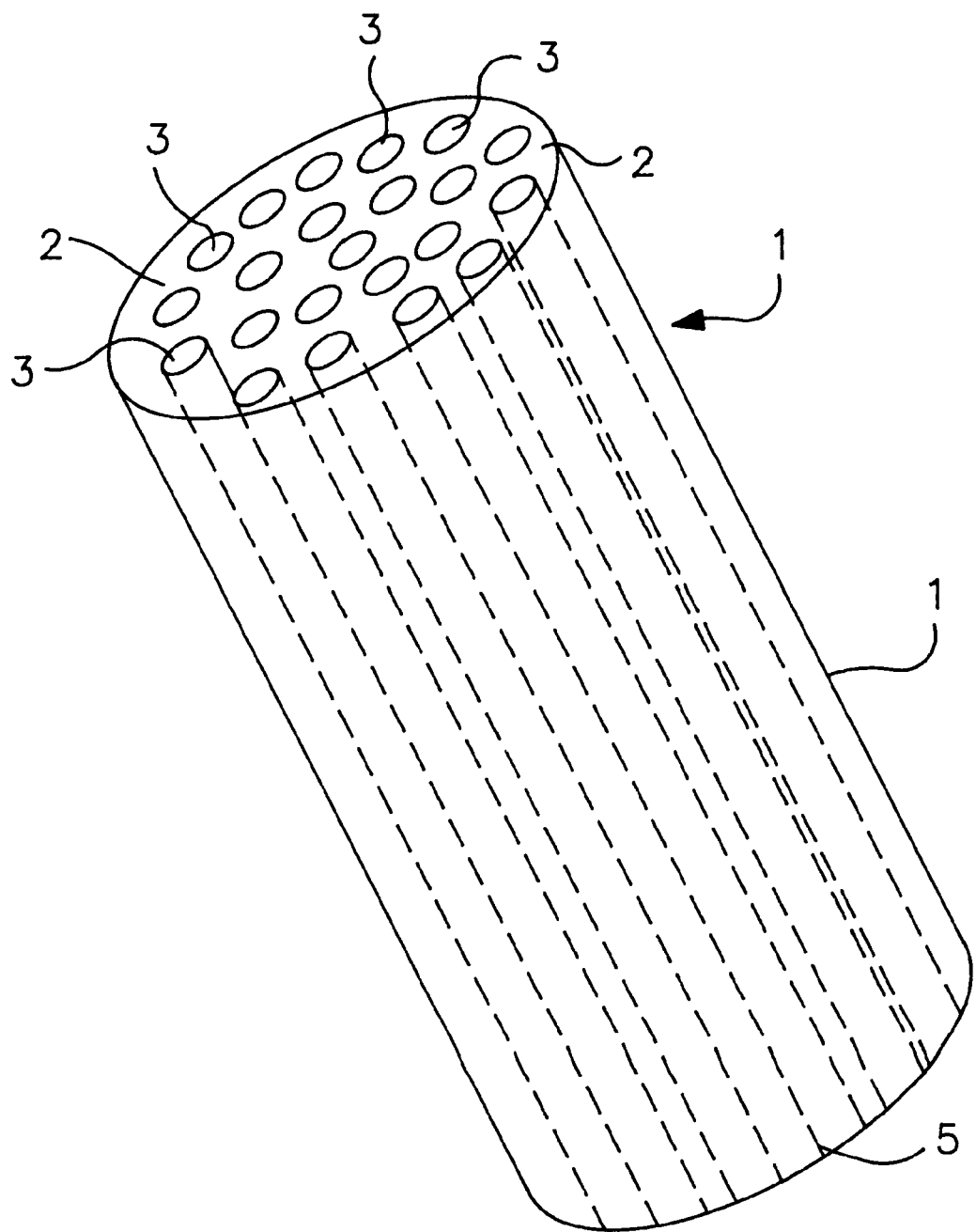
FIG. 1 is a perspective side view of a monolithic adsorption tube prepared by extrusion through an extrusion die of this invention.

FIG. 1 depicts a monolithic adsorption tube 1 manufactured by extrusion through an extrusion die of this invention and comprising a body portion 2 and tunnels 3. The body portion 2 may be of adsorbent particles held together by a suitable binder or bonding agent, such as clay. The adsorbent employed may be selected from any of various known adsorbents available in granular or particulate form including, for example, activated carbon, silica gel, activated alumina, zeolite, and the like. Such adsorbents are known to preferentially or selectively adsorb and thus may be used to collect certain gases and/or to alter the composition of the gases that contact the adsorbent. Furthermore, the monolithic adsorption tube 1 may be used for purposes other than gas adsorption. Thus, for example, body portion 2 may comprise a material such as concrete, formed by extrusion through an extrusion die of this invention, and be used for the absorption of heat from heated gases passing therethrough.

In the monolithic adsorbent structure of FIG. 1, the body portion 2 is further characterized by a plurality of tunnels 3, extending therethrough, substantially parallel to the tube's axis, for the passage of gases.

FIGS. 2–5 illustrate various views and embodiments of the extrusion die of this invention and components thereof. In the embodiment illustrated in FIG. 4, the assembled die 10, comprises die housing 11 enclosing a multiplicity of parallel rods 12 supported by ribs 7, 8, and 9 (shown in FIG. 5) within rib collars 13, 14, and 15, positioned near the entrance end 16 of the die assembly. The rib collars may be stacked directly one on top of the other, or may be spaced slightly apart, with the aid of spacers 17. In the embodiment shown in FIG. 5, the ribs 7, 8 and 9 are arranged in sets, each set within a separate collar. Thus, for example, a set of ribs 7 may be held within rib collar 13; a set of ribs 8, within rib collar 14; and a set of ribs 9, within rib collar 15. To illustrate the spatial relationship between the rods and the ribs in an assembled die, the position of rods 12 are shown as they pass through each illustrated rib collar (FIGS. 5a, 5b, and 5c)) and through the assembly of rib collars as shown in FIG. 5d. Within each collar, in the embodiment shown, the ribs are arranged in a geometric pattern forming angles of 60° and 120° so that each rod 12 is supportedly contacted by three ribs (forming a tight triangle of ribs around the rod) at least two points along the length of the rod, each point being within a separate collar to maintain the rod in position during extrusion. The ribs, within each collar, may be designed with slots 25, for example, as shown in FIG. 3, to permit each rib to nest into one or more other ribs at points where their slots coincide, thus taking up less space and making the assembly more rigid to aid in maintaining the geometric configuration of the ribs. Furthermore, the rib collar 13, 14, and 15 may be grooved to receive the ends of the ribs 7, 8, and 9, to provide additional support.

Figure 2:
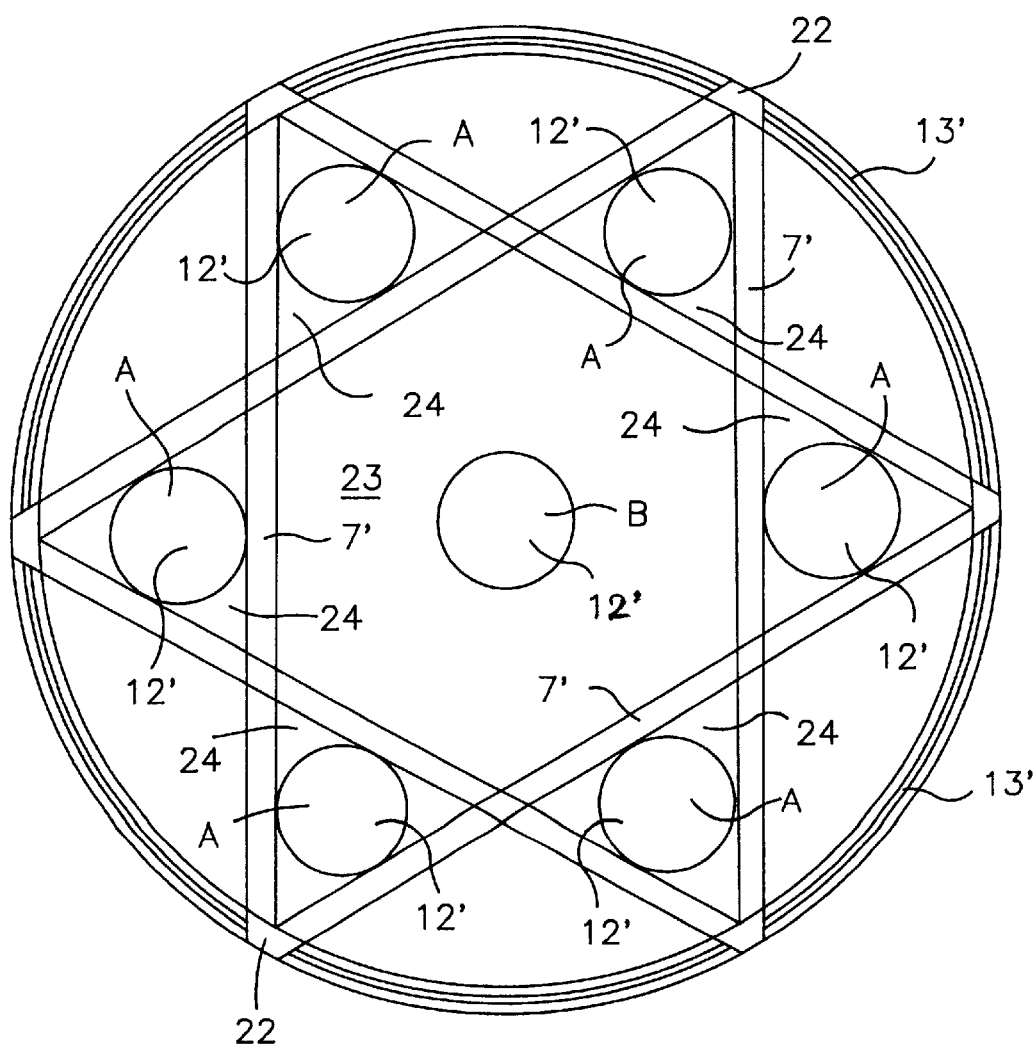
FIG. 2 is a top plan view of an embodiment of a rib collar and rib set of an extrusion die of the invention.
Figure 5A:
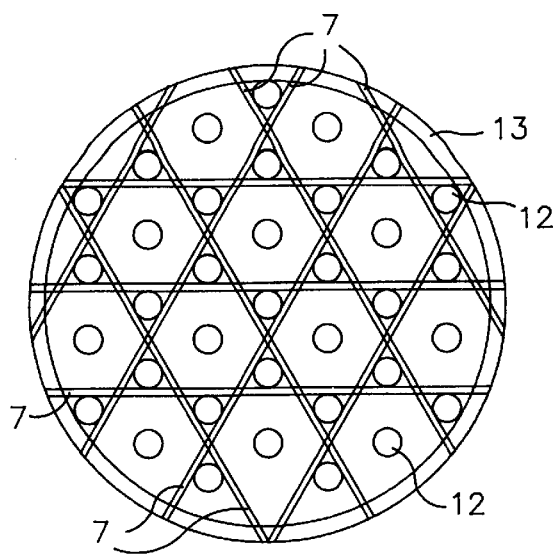
FIGS. 5a–5c are top views of a disassembled set of sub-dies of the invention.
Figure 5B:
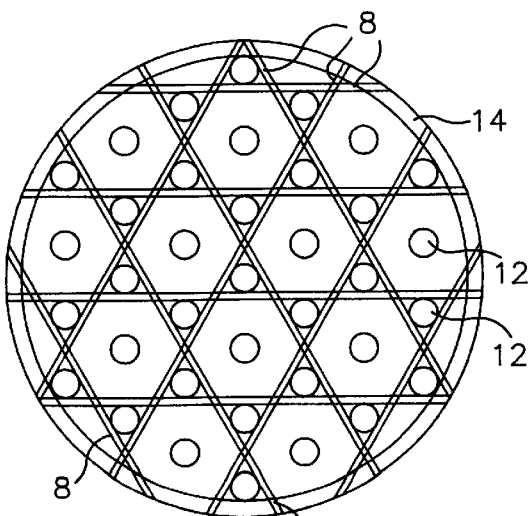
Figure 5C:
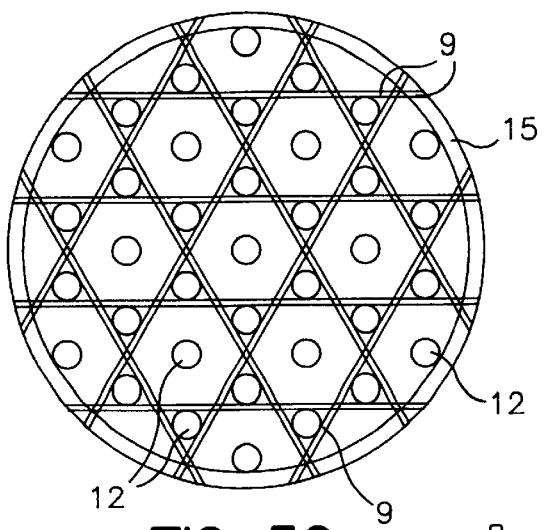
Figure 5D:
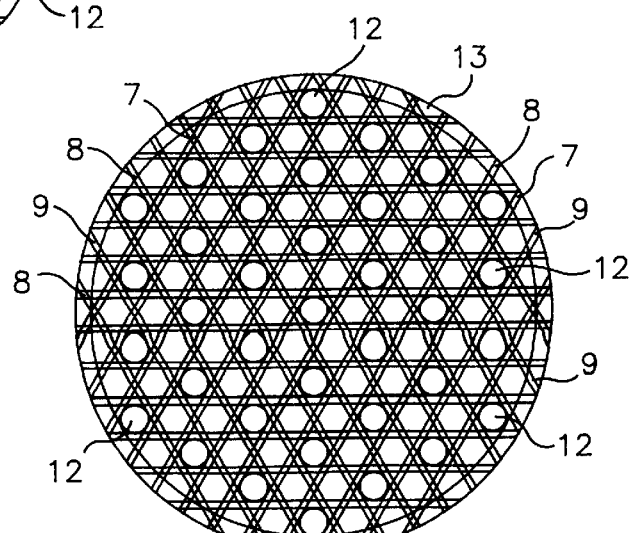
FIG. 5d is a top view of an assembled set of sub-dies of FIGS. 5a–c.

In a preferred embodiment, each sub-assembly of rib collar and ribs is arranged so that one or more rods will be unsupported by ribs in each rib collar to allow a better flow of material during extrusion. This is illustrated in FIG. 2 wherein a rib collar 13' holds a set of six ribs 7', arranged in a triangular pattern to provide support to six of the seven rods 12' passing therethrough, leaving one rod unsupported in rib collar 13'. Each of the six supported rods 12' is designated by the letter "A" and is held in place by a small section of each of three ribs 7' which form an isometric triangle 24 of ribs that contact the rod at three points on its circumference. Each of the ribs 7' spans rib collar 13' and is held in place by grooves 22 in the rib collar. The unsupported rod 12' is designated by the letter "B" and is surrounded by a large hexagonal open area 23 that is free of ribs. The open area 23 allows a better flow of material through the collar during extrusion. When the die 10 is assembled, as in FIGS. 4 and 5, the rod 12' that is unsupported ("B") will be supported by a triangle of ribs within at least two other rib collars. Furthermore, each of the other rib collars and rib sets will have at least one unsupported rod passing therethrough, such as the rod designated "B" in FIG. 2, and the unsupported rod will be surrounded by an open area, such as open area 23, to allow a freer flow of material therethrough during extrusion.

The components of the extrusion die, that is, the housing, ribs, rib collars, and rods, may be made various suitable materials, such as metal, plastic, wood, and the like. Furthermore, the spacing as well as the geometric pattern of the ribs may be varied to allow variations in the pattern, size, number and spacing of the rods and thus of the tunnels in the extruded monolith.

While the invention has been described with reference to preferred embodiments thereof, it will be understood by those skilled in the art that various changes in form and detail may be made without departing from the spirit and scope of the invention.

What is claimed is:

1. An extrusion die comprising:
   a) an outer housing having an entrance end and an exit end for the entrance and exiting of extrudable material;
   b) at least two sub-assemblies, each comprising a rib collar holding a multiplicity of ribs forming a geometric pattern and oriented perpendicular to said housing and positioned approximate the entrance end thereof;
   c) a multiplicity of unattached rods positioned within said housing and said sub-assemblies and oriented parallel to said housing and perpendicular to said ribs and passing through said ribs so that each rod is supportedly contacted and held in place by at least three ribs in at least two of said sub-assemblies.

2. An extrusion die according to claim 1 wherein said housing is cylindrical.

3. An extrusion die according to claim 2 wherein said rods are circular in cross-section.

4. An extrusion die according to claim 3 wherein said geometric pattern is characterized by angles of 60° and 120° between the ribs in each rib collar.

5. An extrusion die according to claim 4 wherein said ribs are held in position by interlocking slots along the length of each rib.

6. An extrusion die according to claim 4 wherein said rib collars are provided with grooves for holding said ribs.

7. An extrusion die according to claim 4 comprising three of said rib collars.

8. An extrusion die according to claim 7 wherein each rod is supportedly contacted by three of said ribs in each of two of said rib collars.

9. An extrusion die according to claim 8 wherein said geometric pattern of ribs within each rib collar comprises at least one open area that permits a rod to pass through without the supported contact of ribs within the rib collar.

10. An extrusion die according to claim 9 wherein said open area is bounded by an hexagonal configuration of ribs.

11. An extrusion die comprising:
    a) an outer cylindrical housing having an entrance end and an exit end for the entrance and exiting of extrudable material;
    b) three rib collars, each holding a multiplicity of interlocking ribs arranged in a geometric pattern wherein said ribs intersect at angles of 60° and 120°, said multiplicity of interlocking ribs being oriented perpendicular to said housing and said rib collars being positioned approximate said entrance end of said cylindrical housing;
    c) a multiplicity of rods positioned within said cylindrical housing and said rib collars, and extending along the length of said cylindrical housing and oriented parallel to said cylindrical housing and perpendicular to said ribs and passing through said ribs and rib collars so that each rod is supportedly contacted and held in place by three ribs within each of two of said rib collars.

12. A method for the manufacture of monolithic tubes having parallel tunnels therewithin, comprising extruding an extrudable composition through the extrusion die of claim 1.

13. A method according to claim 12 wherein said extrudable composition comprises an adsorbent and a binding agent.

14. A method for the manufacture of monolithic adsorption tubes comprising extruding an extrudable mixture of adsorbent and binding agent through the extrusion die of claim 11.

* * * * *